(12) United States Patent
Hild et al.

(10) Patent No.: US 7,930,312 B2
(45) Date of Patent: *Apr. 19, 2011

(54) SYSTEM FOR CONSOLIDATING DATA FROM DISTRIBUTED DATABASES

(75) Inventors: Stefan G. Hild, Somers, NY (US); Rene A. Pawlitzek, Kilchberg (CH); Walid W. Rjaibi, Ontario (CA); Markus Stolze, Bern (CH)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/121,002

(22) Filed: May 15, 2008

(65) Prior Publication Data

US 2008/0222163 A1 Sep. 11, 2008

Related U.S. Application Data

(63) Continuation of application No. 11/227,875, filed on Sep. 15, 2005, now Pat. No. 7,401,101.

(30) Foreign Application Priority Data

Apr. 28, 2003 (EP) .................................. 03405295
Mar. 4, 2004 (WO) ................ PCT/US2004/000669

(51) Int. Cl.
*G06F 7/00* (2006.01)
*G06F 17/00* (2006.01)

(52) U.S. Cl. ......... 707/758; 707/782; 707/754; 709/201
(58) Field of Classification Search .......................... None
See application file for complete search history.

(56) References Cited

U.S. PATENT DOCUMENTS

| | | | |
|---|---|---|---|
| 5,717,604 A | 2/1998 | Wiggins | |
| 6,356,880 B1 | 3/2002 | Goossens et al. | |
| 6,381,587 B1 | 4/2002 | Guzelsu | |
| 6,523,173 B1 | 2/2003 | Bergner et al. | |
| 6,581,068 B1* | 6/2003 | Bensoussan et al. | 1/1 |
| 6,615,220 B1* | 9/2003 | Austin et al. | 1/1 |
| 6,633,878 B1* | 10/2003 | Underwood | 1/1 |
| 6,785,689 B1* | 8/2004 | Daniel et al. | 707/754 |
| 6,792,431 B2 | 9/2004 | Tamboli et al. | |
| 2002/0069143 A1 | 6/2002 | Cepeda | |
| 2002/0107809 A1 | 8/2002 | Biddle et al. | |
| 2002/0107871 A1 | 8/2002 | Wyzga et al. | |
| 2002/0161717 A1 | 10/2002 | Kassan et al. | |
| 2003/0083888 A1 | 5/2003 | Argenton et al. | |
| 2004/0088176 A1 | 5/2004 | Rajamani | |
| 2004/0088730 A1 | 5/2004 | Gopalan et al. | |
| 2004/0093594 A1 | 5/2004 | Kapadia et al. | |
| 2004/0260589 A1 | 12/2004 | Varadarajan et al. | |
| 2005/0049887 A1 | 3/2005 | Bulleit et al. | |
| 2005/0060662 A1 | 3/2005 | Soares et al. | |
| 2005/0065863 A1 | 3/2005 | Plumer et al. | |
| 2006/0036624 A1 | 2/2006 | Hild et al. | |

FOREIGN PATENT DOCUMENTS

WO WO 2004/070574 A2 8/2004

* cited by examiner

*Primary Examiner* — Pierre M Vital
*Assistant Examiner* — Loan T Nguyen
(74) *Attorney, Agent, or Firm* — Gibb I.P. Law Firm, LLC

(57) ABSTRACT

The present invention discloses a method, request detector, inference engine, and system for consolidating data from distributed databases into a central database. The method comprises the steps of receiving access information comprising request information to the distributed databases, analyzing the received access information, and aggregating into the central database the data content of the distributed databases in dependence on the analyzed access information.

5 Claims, 3 Drawing Sheets

SYSTEM FOR CONSOLIDATING DATA FROM DISTRIBUTED DATABASES

CROSS-REFERENCE TO RELATED APPLICATIONS

This application is a Continuation of U.S. application Ser. No. 11/227,875 filed Sep. 15, 2005, the complete disclosure of which, in its entirety, is herein incorporated by reference.

TECHNICAL FIELD

The present invention is related to a method, apparatus, and system for consolidating data from distributed databases into a central database.

BACKGROUND OF THE INVENTION

Today many organizations concentrate their IT (information technology) spending on methods and technologies that help them reduce cost by increasing the efficiency and effectiveness of their IT infrastructure. A key pain point faced by many organization and companies is that, in the beginning of the Internet boom. also called the 'dot-corn' bubble, many organizations had to embrace the Internet overnight, and in doing so established infrastructure elements in an ad-hoc fashion that were not well-designed for scalability or growth. Today, these organizations and companies are faced with infrastructures that are loosely assembled, are costly to maintain, and are difficult and expensive to grow with the business needs. This is evident in both the business processes as well as in the way these organizations manage data.

In many instances, the data is fragmented within the organization or company, with different database systems being utilized in different departments, all of which often maintain essentially the same data in multiple formats using different database table designs. Here, it would be hugely beneficial to maintain all data a (logically) single place using a standardized schema. Having such centralized data warehouse or database engine would enable quick data analysis for improved customer relationship management, simplify development of new products, and reduce maintenance cost for the IT infrastructure itself while improving the reliability and availability of the entire system.

The international publication WO 99/52047A1 relates to a method and system for migrating data from one or more ASCII files and/or from one or more relational databases to one or more relational database tables without the need to write code. This allows the user to define mapping templates and conditionals to assist in translating and transforming data values. The method also enforces referential integrity, data dependencies, order of operations, and uniqueness constraints using a predefined set of migration rules templates that are based on the principles of relational design. The method uses these mapping and migration rules templates to generate instructions for updating or populating relational database destination tables. The instructions control the data transfer, data translation, data transformation, data validation, foreign key insertion, and the addition of required codes and flags in the destination tables. A migration engine of the system includes a data map architect and an update processor which spawns the templates and migrates the data dynamically, utilizing the data definitions for the destination tables.

This prior art has the drawback that it is limited to a particular type of database systems, in which Oracle® Application tables are implemented. This requires users to manually define rules for the migration or at least interactively, i.e. by user interaction. (Oracle is a trademark of Oracle Corporation). This prior art does not show provisions which allow to discover databases across an organization or augment a consolidation process with actual access patterns.

From the above follows that there is still a need in the art for an efficient scheme that allows to consolidate data from distributed databases into a central database.

SUMMARY AND ADVANTAGES OF THE INVENTION

Disclosed is a scheme that performs two basic tasks, in which a) it monitors existing database access patterns in order to derive an overall view of the available data sources within an organization and how they are used, and b) over time it aggregates the data content of the various data sources into a new centralized repository and redirects calls to the remote database servers to this central database.

For that, three infrastructure elements are employed. So-called sensors, also referred to as interceptors or request detectors, monitor any data access across an organization or network. An inference engine that analyses the access patterns and the data formats contained in the individual databases. A central database, also referred to as central data warehouse or centralized repository, aggregates the data from the individual data sources with the view to replace those eventually.

In the following the single infrastructure elements are explained in more detail.

The sensors or request detector are attached to infrastructure elements, typically software drivers that manage the database access of users and/or applications, and record the requests that are being submitted by users and applications. A typical example of such sensor is a modified ODBC (JDBC) driver. For instance, JDBC drivers are Java code that are frequently used today to access databases from Java programs. By modifying the JDBC driver the sensor logic can record all data requests that are initiated from programs or users to databases, and also which database is being addressed. Other examples can be derived by modifying the database itself. All data access is logged and transmitted to the inference engine, either in real time or in batch mode.

The inference engine analysis the data access recorded by the sensors or request detectors to identify the database engines used which are distributed databases within a network or networks and ii the data schemes employed: for example, the inference engine learns what the format of the data tables is in the various database engines, what primary keys and foreign keys are employed, and what type of data is contained within those databases tables. Further, the inference engine can perform a correlation iii between different databases; for example, the inference engine should correlate columns from different databases even though they may not be named the same.

Based on the results of the inference the engine generates a new data schema, generates an instance of that schema on the central data warehouse, i.e. the central database. Over time the inference engine then copies existing data from the individual distributed databases that have been discovered into this new central database. When completed, the inference engine may issue an order to redirect calls to the individual databases to the central data warehouse. This can be done by advising the request detectors to intercept the individual data access calls and redirecting them to the central database.

The central data warehouse or central database is a database engine, e.g. an IBM DB/2. For increased availability a cluster may be utilized.

In accordance with the present invention, there is provided a method for consolidating data automatically from distributed databases into a central database. The method comprises the steps of receiving access information comprising request information to the distributed databases, analyzing the received access information, and aggregating into the central database the data content of the distributed databases in dependence on the analyzed access information. This allows a simple automatic migration of redundant data distributed over several databases.

The method can further comprise the steps of filtering the request information to the respective distributed databases from data traffic and forwarding the filtered request information within the access information to an inference engine. All the collected request information can be analyzed in one place i.e. the information from the various databases can be compared and possible consolidations can be investigated.

For the central database a new data schema based on the analyzed access information can be generated. This has the advantage that a consolidated scheme can be used that meets the needs of the various distributed databases.

The analyzing step can comprise the usage of log-file information. This is simple to perform and does not require any change in the infrastructure, but may not yield access data at the same level of detail as a sensor or request detector would detect.

In accordance with another aspect of the present invention, there is provided a request detector for supporting data consolidation from distributed databases into a central database. The request detector can comprise a detecting means for detecting request information to the distributed databases, a transforming means that derives access information from the detected request information, and a providing means that sends the access information to an inference engine.

The request detector can be provided at each of the distributed databases to be consolidated, preferably in form of a modified ODBC (JDBC) driver. The request detector may even be integrated into each of the distributed databases to be consolidated.

The request detector can comprise redirecting means for redirecting a request to an individual database to the central database. This has the advantage that the request is forwarded directly to the consolidated central database and the user may get more information than it is provided by the individual database.

In accordance with yet another aspect of the present invention, there is provided an inference engine for controlling data consolidation from distributed databases into a central database. The inference engine can comprise means for analyzing of access information that is received from distributed databases and comprises request information to the respective distributed databases.

The inference engine can comprise a correlation means for correlating columns and/or rows between different distributed databases, but also fields, records, and/or data structures can be correlated. This leads to a new schema that then can be used by the consolidated central database.

The inference engine allows a simple migration of the data. Equivalent information or data is brought together and stored on one place. This helps to avoid doubles in distributed systems.

In accordance with a further aspect of the present invention, there is provided a system for consolidating data from distributed databases into a central database. The system comprises a request detector at each of the distributed databases to be consolidated for providing access information comprising request information to the distributed databases, an inference engine for analyzing the received access information, and a central database into which the data content of the distributed databases is aggregated in dependence on the analyzed access information.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DESCRIPTION OF EMBODIMENTS

Figure 1:
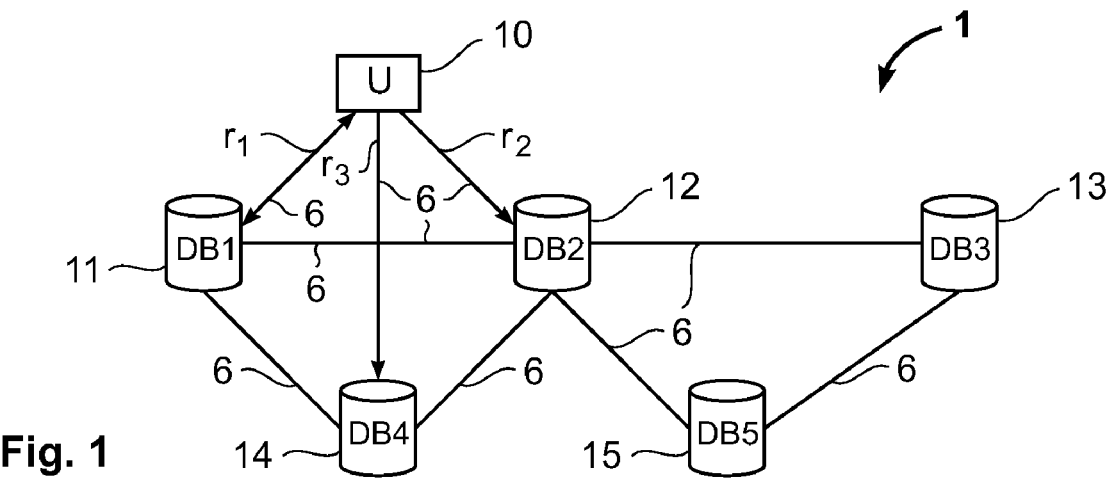
FIG. 1 shows a schematic illustration of a distributed database structure.

FIG. 1 shows a schematic illustration of a distributed database structure 1 with distributed databases 11, 12, 13, 14, 15. The databases, also labeled with DBx, are connected and accessible via a network 6. A user 10, also labeled with U, accesses here three distributed databases 11, 12, 14 in order to receive information that is distributed and provided by a first database 11, a second database 12, and a third database 14. In detail, the user 10, i.e. a user's computer, sends a first request $r_1$ to the first database 11, a second request $r_2$ to the second database 12, and third request $r_3$ to the third database 14. The user 10 receives the respective responses from the distributed databases 11, 12, 14 which then can be evaluated. However, in the example, three requests $r_1, r_2, r_3$ are sent to get the desired information. Further, the maintenance of all the distributed databases 10, 11, 12, 13, 14, 15 with overlapping content is not efficient and effective.

The same reference signs are used within the description to denote the same or like parts.

Figure 2:
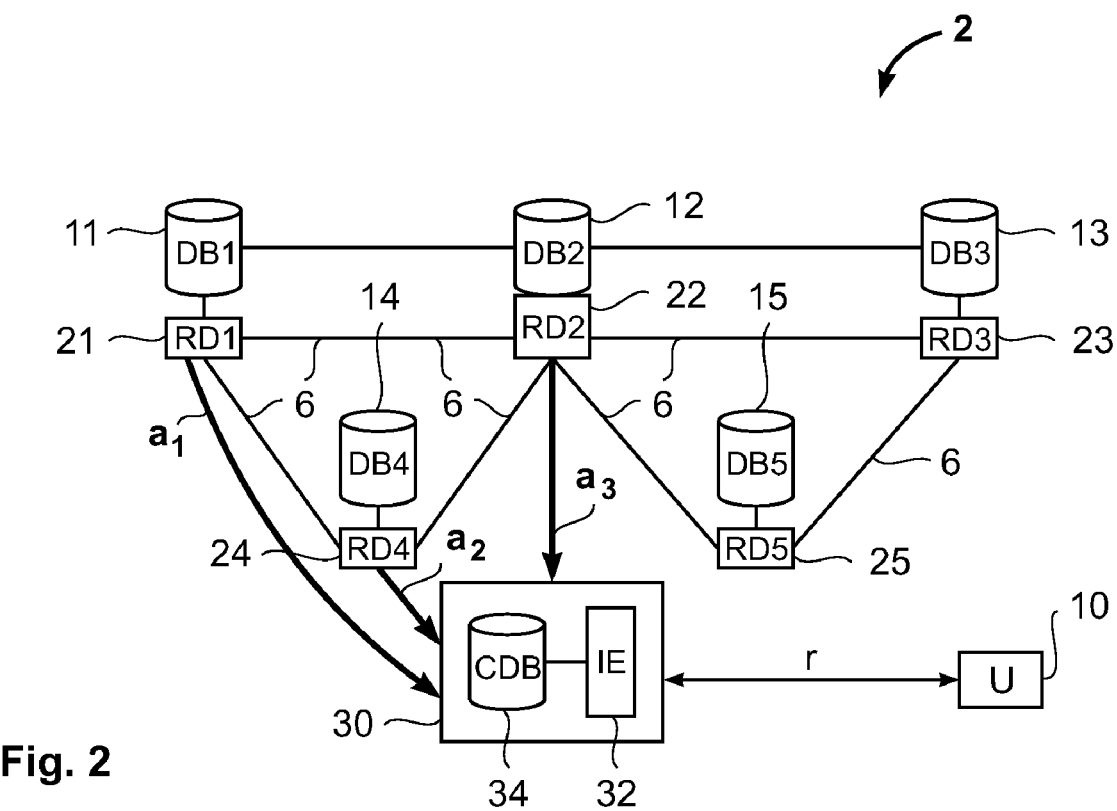
FIG. 2 shows a schematic illustration of database structure according to the present invention.

Turning to FIG. 2, which shows a schematic illustration of a modified database structure 2 according to the present invention. The database structure further comprises request detectors 21, 22, 23, 24, 25 attached to each of the distributed databases 11, 12, 13, 14, 15, respectively. Further, there is provided and connected to the network 6 a central data unit 30. This unit comprises an inference engine 32 and a central database 34 which are connected to each other and to the network 6, and thus to the distributed databases 11, 12, 13, 14, 15.

It is assumed that the user 10 sends the same requests $r_1, r_2, r_3$ to the respective distributed databases 11, 12, 14 as described with reference to FIG. 1. Each of the requests $r_1, r_2, r_3$ to the respective distributed databases 11, 12, 14 is now detected by the respective request detectors 21, 22, 24. For that, the detectors 21, 22, 23, 24, 25 comprise of detecting means (not shown) for detecting such requests $r_1, r_2, r_3$ to the distributed databases 11, 12, 14. From the requests $r_1, r_2, r_3$ also referred to as request information, access information $a_1, a_2, a_3$ is derived indicating, e.g. a database address, inquiry details, etc. The access information $a_1, a_2, a_3$ is then sent to the inference engine 32 as indicated in FIG. 2.

The central data unit 30, i.e. the inference engine 32, receives the access information $a_1, a_2, a_3$ comprising request information $r_1$, $r_2$, $r_3$ and analyzes the received access information $a_1$, $a_2$, $a_3$ by using correlation means for correlating columns and/or rows between different distributed databases 11, 12, 13, 14, 15. In dependence on the analyzed access information, the data content of the distributed databases 11, 12, 13, 14, 15 is aggregated into the central database 34.

After some time, the distributed databases 11, 12, 13, 14, 15 can be removed, since the content is then consolidated and stored in the central database 34. This allows more redundancy in storage and better archiving possibilities.

For the user 10 and the system it is advantageous that after the consolidation only one request r is to be sent to the central data unit 30. In response to that request r a more complete data set can be provided to the user 10.

Figure 3A:
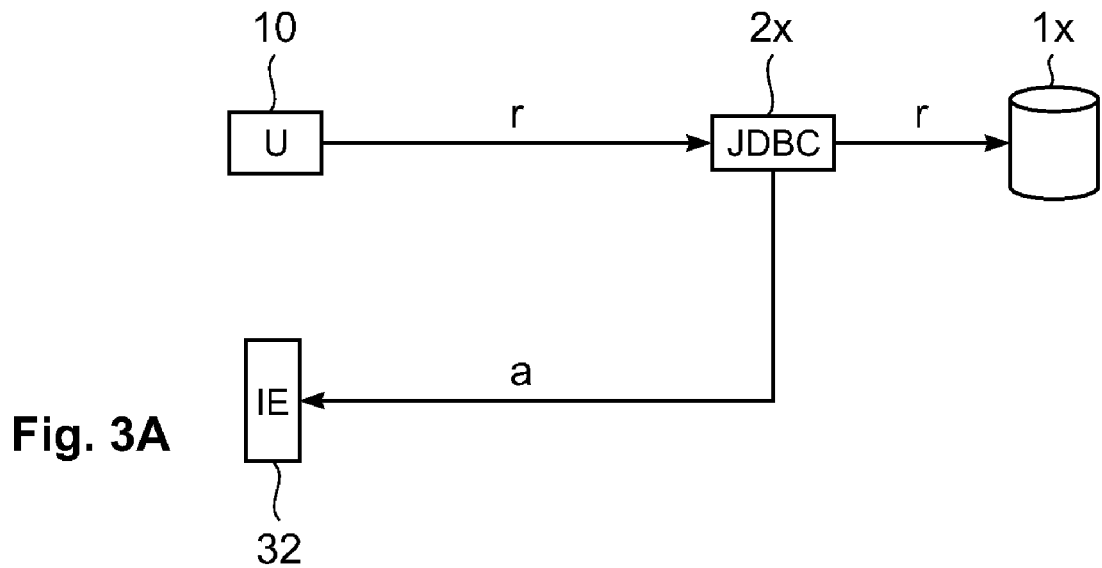
FIG. 3a shows a schematic illustration of a request and access information flow.

FIG. 3a shows a schematic illustration of a flow of a request r and access information a for current 5 distributed database structures in order to establish the central database 34. In the example, the request r is sent by the user 10 to one distributed database 1x. The request detector 2x attached to the distributed database 1x receives this request r, transforms it to access information and sends this access information for purposes of analysis to the inference engine 32.

Figure 3B:
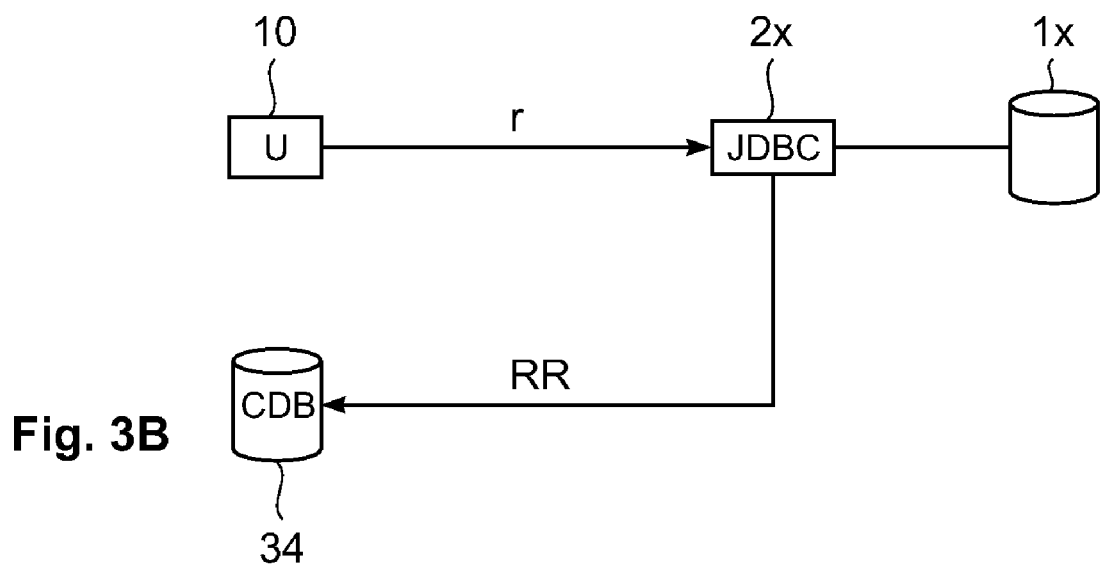
FIG. 3b shows a schematic illustration of a redirect flow.

FIG. 3b shows a schematic illustration of a redirect flow. This is performed when the data consolidation has been performed successfully. Then, the request detector 2x is informed by the inference engine 32 about redirecting and any request r sent by the user 10 is redirected as a redirect request RR by the request detector 2x to the central database 34. The request inquiry is then answered by the consolidated central database 34.

Figure 4:
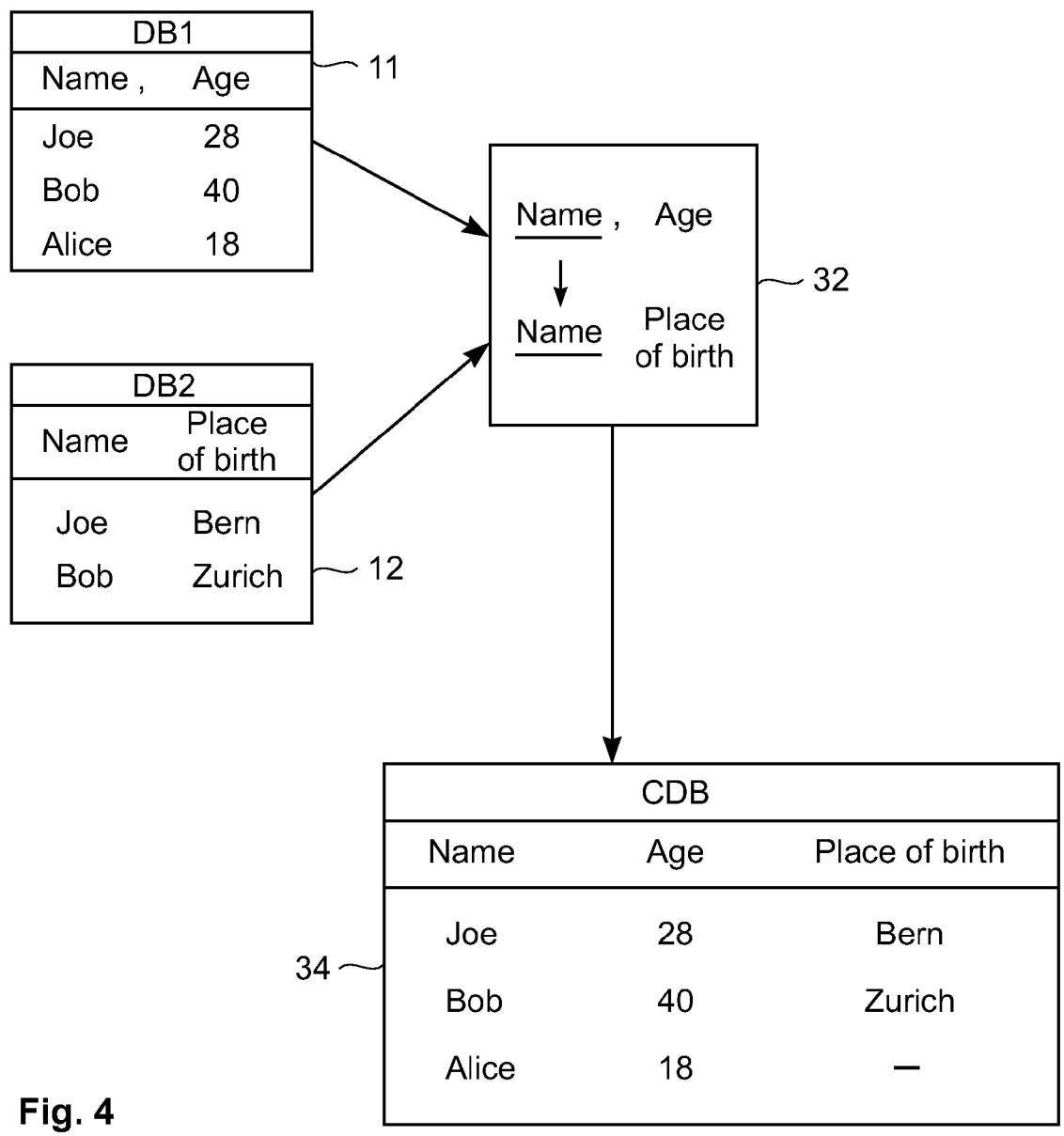
FIG. 4 shows schematic illustration of a consolidation of two databases into a central database.

FIG. 4 shows a schematic illustration of a consolidation of two distributed databases 11, 12 into a 15 central database 34. The figure shows on the left hand side the content of the first database 11 and the content of the second database 12. The first database 11 stores "Names", like Joe, Bob and Alice, and their respective "Age", 28, 40, and 18. The second database 12 stores also "Names", here Joe and Bob, but is stores further the "Place of birth" instead of the Ages. As can be seen from this simple example, there are some overlapping names, i.e. information, like it is the case in many distributed database structures today. A data consolidation of the data is therefore desired saving infrastructure and maintenance costs. The inference engine 32 analyzes the available data, compares it, and performs a correlation. This correlation correlates columns and/or rows between different distributed databases to find similarities or matches. As indicated in the figure, the data fields "Name" appear in both distributed databases 11, 12. Thus, the distributed databases 11, 12 are candidates to merge their content into the central database 34. The inference engine 32 generates the new data schema and provides it to the central database 34. Finally, the central database 34 is filled with the content of the distributed databases 11, 12 to have the fields "Name", "Age", and "Place of birth" with the records for 'Joe, 28, Bern'; 'Bob 40, Zurich'; and 'Alice, 18'.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

The invention claimed is:

1. A system for consolidating data from distributed databases into a central database comprising:
   a first processor and a first memory implementing a request detector attached to each of the distributed databases to be consolidated said request detector detecting request information comprising access information to each distributed database;
   a second processor and a second memory implementing an inference engine associated with the central database for analyzing the access information and generating an instruction indicating successful data consolidation from a distributed database; and
   a central database into which data content of each distributed database is aggregated based on analyzed access information,
      wherein the request detector redirects a request to the distributed database as a redirect request to the central database, based on the instruction received by the request detector from the inference engine indicating successful data consolidation.

2. The system according to claim 1, said system providing a request detector at each of the distributed databases to be consolidated.

3. The system according to claim 1, said system filtering the request information to the respective distributed databases from data traffic and forwarding the filtered request information within the access information to an inference engine.

4. The system according to claim 1, said system integrating the request detector into each of the distributed databases to be consolidated.

5. The system according to claim 1, said system generating for the central database a new data schema based on the analyzed access information.

* * * * *